US012180778B2

(12) United States Patent
Glayse

(10) Patent No.: US 12,180,778 B2
(45) Date of Patent: Dec. 31, 2024

(54) ACCESS BARRIER, RELATED DEVICES AND RELATED METHODS

(71) Applicant: CONDUENT BUSINESS SERVICES, LLC, Dallas, TX (US)

(72) Inventor: Sylvain Glayse, Bourg-les-Valence (FR)

(73) Assignee: Conduent Business Services, LLC, Florham Park, NJ (US)

( * ) Notice: Subject to any disclaimer, the term of this patent is extended or adjusted under 35 U.S.C. 154(b) by 1189 days.

(21) Appl. No.: 16/337,651

(22) PCT Filed: Sep. 28, 2017

(86) PCT No.: PCT/IB2017/055971
§ 371 (c)(1),
(2) Date: Mar. 28, 2019

(87) PCT Pub. No.: WO2018/060924
PCT Pub. Date: Apr. 5, 2018

(65) Prior Publication Data

US 2019/0345765 A1 Nov. 14, 2019

(30) Foreign Application Priority Data

Sep. 30, 2016 (FR) ........................................ 1670568

(51) Int. Cl.
*E06B 11/08* (2006.01)
*E05G 5/00* (2006.01)

(52) U.S. Cl.
CPC ............ *E06B 11/085* (2013.01); *E05G 5/003* (2013.01)

(58) Field of Classification Search
CPC ................................ E06B 11/085; E05G 5/003
See application file for complete search history.

(56) References Cited

U.S. PATENT DOCUMENTS 3,169,329 A * 2/1965 Powers .................. G07F 17/145 49/35
3,386,202 A * 6/1968 Crews .................... G07F 17/145 49/35

(Continued)

FOREIGN PATENT DOCUMENTS

CN 101 351612 A 1/2009
CN 202 108358 U 1/2012

(Continued)

OTHER PUBLICATIONS

PCT/ISA/237, Written Opinion of the ISA in PCT/IB2017/055971, dated Dec. 8, 2017 with ISR.

(Continued)

*Primary Examiner* — Catherine A Kelly
(74) *Attorney, Agent, or Firm* — Jones Robb, PLLC

(57) ABSTRACT

An access control device includes a primary access barrier configured move between a closed position and an open position. The primary access barrier may be configured to extend into an access passage of the access control device to prevent access through the access passage when in the closed position and to move away from the access passage to permit access through the access passage when in an open position. An entry access barrier is positionable in the access passage of the access control device on a first side of the primary access barrier, and an exit barrier is positionable in the access passage of the access control device on a second side of the primary access barrier opposite the first side. Systems and methods relate to access control devices.

25 Claims, 8 Drawing Sheets

(56) References Cited

U.S. PATENT DOCUMENTS

| | | | | | |
|---|---|---|---|---|---|
| 3,606,698 | A * | 9/1971 | Tanaka et al. | G07C 9/15 340/5.31 |
| 3,742,647 | A * | 7/1973 | Tomita | E06B 11/085 49/35 |
| 4,308,803 | A * | 1/1982 | Pretini | E06B 3/903 109/21 |
| 4,843,761 | A * | 7/1989 | Sandling | E06B 3/906 49/44 |
| 5,212,909 | A * | 5/1993 | Morin | E06B 11/085 49/257 |
| 5,333,410 | A * | 8/1994 | Tetherton | G07F 17/145 49/35 |
| 6,185,867 | B1 * | 2/2001 | McGuire | E06B 11/085 49/46 |
| 7,617,974 | B2 * | 11/2009 | Vandyck | G07C 9/10 235/382 |
| 8,020,603 | B2 * | 9/2011 | Burgin | E06B 11/085 160/134 |
| 8,127,492 | B1 * | 3/2012 | Hellman, Sr. | E06B 11/085 49/49 |
| 8,416,056 | B2 * | 4/2013 | Miller | E06B 11/085 340/3.1 |
| 8,657,190 | B2 * | 2/2014 | Lais | G07C 9/37 235/380 |
| 9,243,449 | B1 * | 1/2016 | Ziemkowski | E05G 5/00 |
| 9,761,076 | B2 * | 9/2017 | Huff | G07C 9/15 |
| 2009/0128284 | A1 * | 5/2009 | Floyd | G07C 9/10 340/5.31 |
| 2011/0167727 | A1 * | 7/2011 | Kamise | G07C 9/15 49/70 |
| 2011/0277518 | A1 | 11/2011 | Lais et al. | |
| 2015/0218874 | A1 * | 8/2015 | Osann, Jr. | E05F 15/627 49/31 |

FOREIGN PATENT DOCUMENTS

| | | | | |
|---|---|---|---|---|
| CN | 105 518749 A | | 4/2016 | |
| CN | 205 474 968 U | | 8/2016 | |
| EP | 1 992 780 A2 | | 11/2008 | |
| FR | 3015746 A1 | * | 6/2015 | G07C 9/02 |

OTHER PUBLICATIONS

Nov. 11, 2021 EU Application No. 17 784 698.7-1005 Communication Pursuant to Article 94(3) EPC.

* cited by examiner

--PRIOR ART--

--PRIOR ART--

ACCESS BARRIER, RELATED DEVICES AND RELATED METHODS

CROSS-REFERENCE TO RELATED APPLICATIONS

This application claims priority to PCT/IB2017/055971, filed Sep. 28, 2017, which claims priority to French Patent Application No. 16 70568, filed Sep. 30, 2016, each of which are incorporated by reference herein in its entirety.

TECHNICAL FIELD

Aspects of the present disclosure relate to handicap-accessible access barriers configured to control access to reserved areas.

BACKGROUND

Access controls are used to restrict access to various locations. For example, in public transit stations, access to a platform or other controlled area is restricted to holders of a valid ticket or otherwise authorized persons. Access controls may require a user to traverse a passage selectively closed by obstacles or access barriers. Such access barriers can be of various shapes, sizes, and configurations. Examples of such barriers can include turnstiles, gates, drop arms, etc.

In some cases, the access barriers comprise two fan-shaped barriers, each of which is composed of portions of decreasing sizes which retract within one another to permit passage. Such barriers may only be marginally effective, because it may be relatively easy for a person to straddle and climb over the barrier.

Other barriers may include pivoting swivel doors which are more difficult to straddle. But to provide access for disabled persons, wheelchairs, etc., at least one passage in a line or arrangement of access control passages may be wider than a standard passage, and due to the extra width of the passage, multiple persons can potentially pass through simultaneously, thus permitting unauthorized passage.

One solution for preventing unauthorized access through an accessible control barrier is to form an "airlock" type access control defined by two barriers, one of which is located at an entrance, the other of which is located at the exit. Such a configuration can limit the number of people present in the lock area and allows only a single direction of traffic flow. The entrance door can be programmed to remain closed until a user requests access by pressing a button or presenting a ticket. Alternatively, the entrance door can remain open and close when a user enters the lock. Exit from the lock may then be permitted by again presenting the ticket, or pressing a button which allows the user to retrace their steps through the entrance if the person does not have a ticket.

Such "airlock" type access barriers have several disadvantages. First, such an airlock may create a feeling of confinement for the user inside the lock between the closed entrance and exit barriers. Second, access barriers of this type may have significant bulk of the structure and hardware supporting the doors, and additionally the structure may be required to contain the doors when the doors are in the retracted position, resulting in a loss of useful width on the control line and reducing the number of possible passes.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, an access control device comprises a primary access barrier configured move between a closed position and an open position. The primary access barrier is configured to extend into an access passage of the access control device to prevent access through the access passage when in the closed position and is configured to move away from the access passage to permit access through the access passage when in an open position. The access control device further includes an entry access barrier positionable in the access passage of the access control device on a first side of the primary access barrier and an exit barrier positionable in the access passage of the access control device on a second side of the primary access barrier opposite the first side.

In accordance with another exemplary embodiment, a method of granting access to a restricted area through an access control device with an access passage, comprises permitting a user passage beyond an entry barrier positioned at an entry to the access control device to provide the user access to an access passage in which a closed primary access barrier is positioned. Subsequent to a user entering the access passage in which the closed primary access barrier is positioned, the primary access barrier is retracted to allow the user to proceed beyond the primary access barrier in the access passage. The method further includes closing an exit barrier positioned at an exit of the access passage beyond the primary access barrier, closing the entry barrier to enclose the user within the access passage, and opening the exit barrier to permit the user to exit the access passage into the restricted area.

In accordance with yet another exemplary embodiment, an access control system includes at least one first access lane. The at least one first access lane has a width defined by first and second trunk portions, and the first and second trunk portions extend along a length of the at least one first access lane. The access control system includes at least one second access lane, the at least one second access lane being adjacent to the at least one first access lane and having a width defined by the second trunk portion and a third trunk portion. The second access lane comprises a primary barrier configured to block access through the second access lane in a closed position and allow passage through the second access lane in an open position, and at least one secondary access barrier positioned in the second access lane on a side of the primary barrier, the at least one secondary access barrier configured to at least partially retract into the second trunk portion.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation.

DETAILED DESCRIPTION

Figure 1:
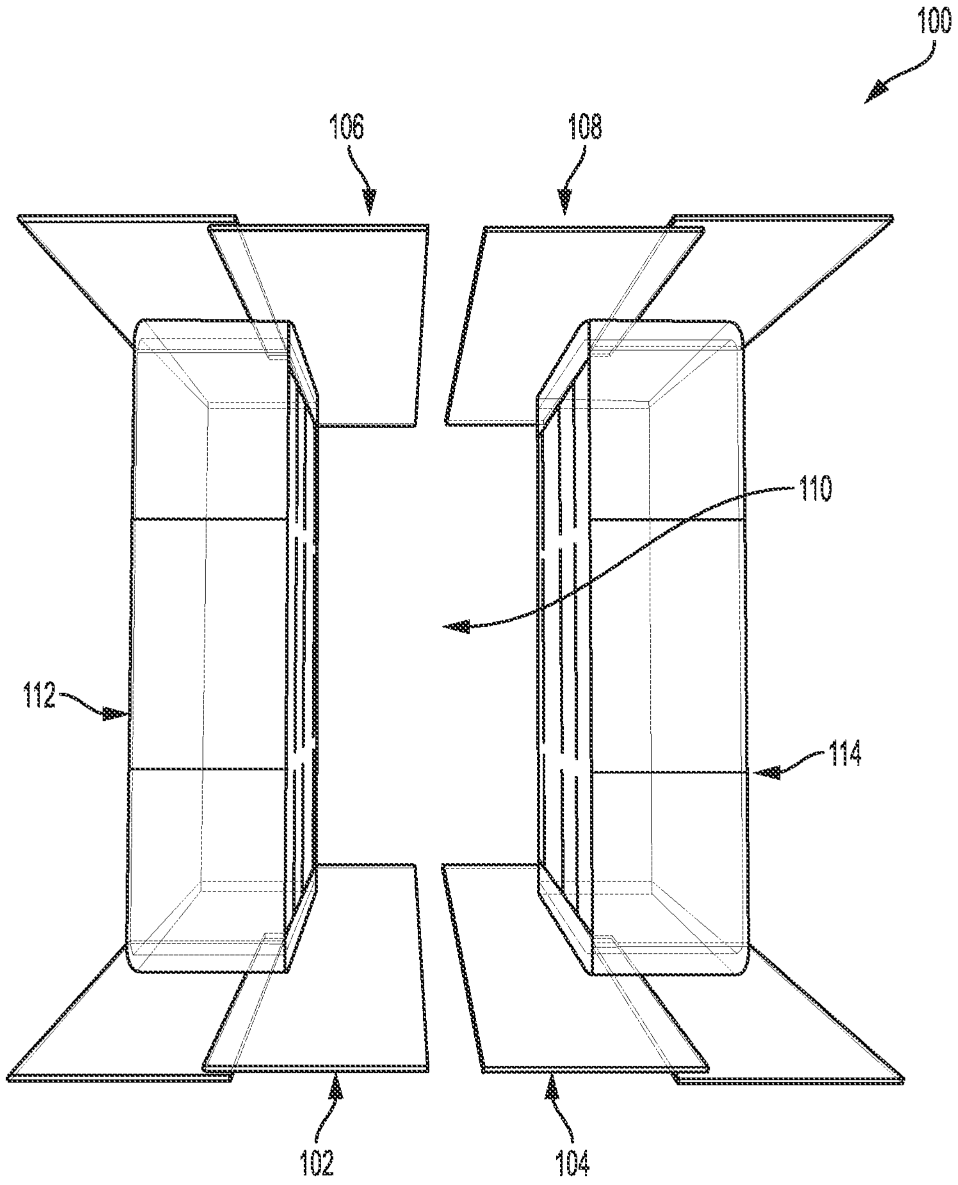
FIG. 1 is a top view of a conventional accessible access barrier.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure or claims. For example, spatially relative terms—such as "beneath," "below," "lower," "above," "upper," "proximal," "distal," and the like—may be used to describe one element's or feature's relationship to another element or feature as illustrated in the orientation of the figures. These spatially relative terms are intended to encompass different positions (i.e., locations) and orientations (i.e., rotational placements) of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. The relative proximal and distal directions of surgical instruments are labeled in the figures.

The present disclosure contemplates access controls in a handicapped accessible passage while preventing passage of unauthorized persons, while limiting the bulk of the structure and hardware supporting the access controls and enabling the handicapped accessible passage to have a common trunk with an adjacent passage. Exemplary access barriers of the disclosure include a primary barrier having a first configuration, and at least one auxiliary barrier having a second configuration different from the first configuration. For example, access barriers according to the disclosure include a main barrier that creates an impassible obstacle when closed, and two auxiliary barriers. The auxiliary barriers may be positioned to provide an entry barrier and an exit barrier to the passage. In an exemplary embodiment, the access barriers may be configured such that at least one barrier is always closed, to prevent unauthorized passage such as by passing through in a reverse direction simultaneously with a person gaining authorized passage.

Referring now to FIG. 1, a top view of a conventional handicapped access control device 100 is shown. The conventional handicapped access control device 100 includes entry doors 102, 104, and exit doors 106, 108. The entry doors 102, 104 and exit doors 106, 108 have sufficient height to create an effective impediment against a person straddling and climbing over the entry doors 102, 104 or exit doors 106, 108.

A secure area 110 is defined between the entry doors 102, 104, the exit doors 106, 108, and left and right trunk portions 112 and 114, respectively of the conventional handicapped access control device 100. Entry to the secure area 110 is accomplished by, for example, pressing a button or by presenting a ticket at a reader (not shown). As can be seen in FIG. 1, the secure area 110 is sized to permit multiple persons simultaneously, such as a person in a wheelchair and an assist person.

The entry doors 102, 104 and exit doors 106, 108 are high enough to prevent fraud such as persons gaining access by straddling the doors, as noted above. But such height can result in an uncomfortable feeling of confinement for those persons within the secure area 110 when the entry doors 102, 104 and exit doors 106, 108 are closed. To exit the secure area 110 once the entry doors 102, 104 are closed, the person must validate the ticket by, for example, presenting the ticket at a reader (not shown) within the secure area, after which the exit doors 106, 108 open and permit the person to leave the secure area 110.

The width of the secure area 110 must be wide enough to accommodate mobility equipment such as a wheelchair. When open, the entry door 102 and exit door 106 (i.e., the doors on the left-hand side in the perspective of FIG. 1) are housed within the left trunk portion 112 of the control device 100, while the entry door 104 and exit door 108 (i.e., the doors on the right-hand side) are housed within the right trunk portion 114 of the control device 100. Because the width of each door must be contained within the respective trunk portions, the minimum width of the left and right trunk portions 112 and 114 is determined by the width of the doors as required to block access to the secure area 110 when the doors are closed. Thus, to provide sufficient width to permit passage of a wheelchair or other mobility device, the trunk portions must also be sufficiently wide to accept the doors as they open.

Additionally, in some configurations, the total width of the trunk portions 112 and 114 cannot be combined with a width of a trunk portion of an adjacent passage, because the doors may be adjacent to various components, such as ticket validation equipment, in the trunk of the adjacent passage. That is, where you have two adjacent passages, the passages may not be able to share a central trunk portion but instead may each require two separate trunk portions defining the passages. For example, in a standard passage, the ticket validation equipment may be in a top or upper portion of the trunk, and the height of the trunk associated with the accessible access control device 100 may make it impossible or impractical to locate the ticket validation equipment in the trunk portion of the conventional accessible access control device 100.

Figure 2:
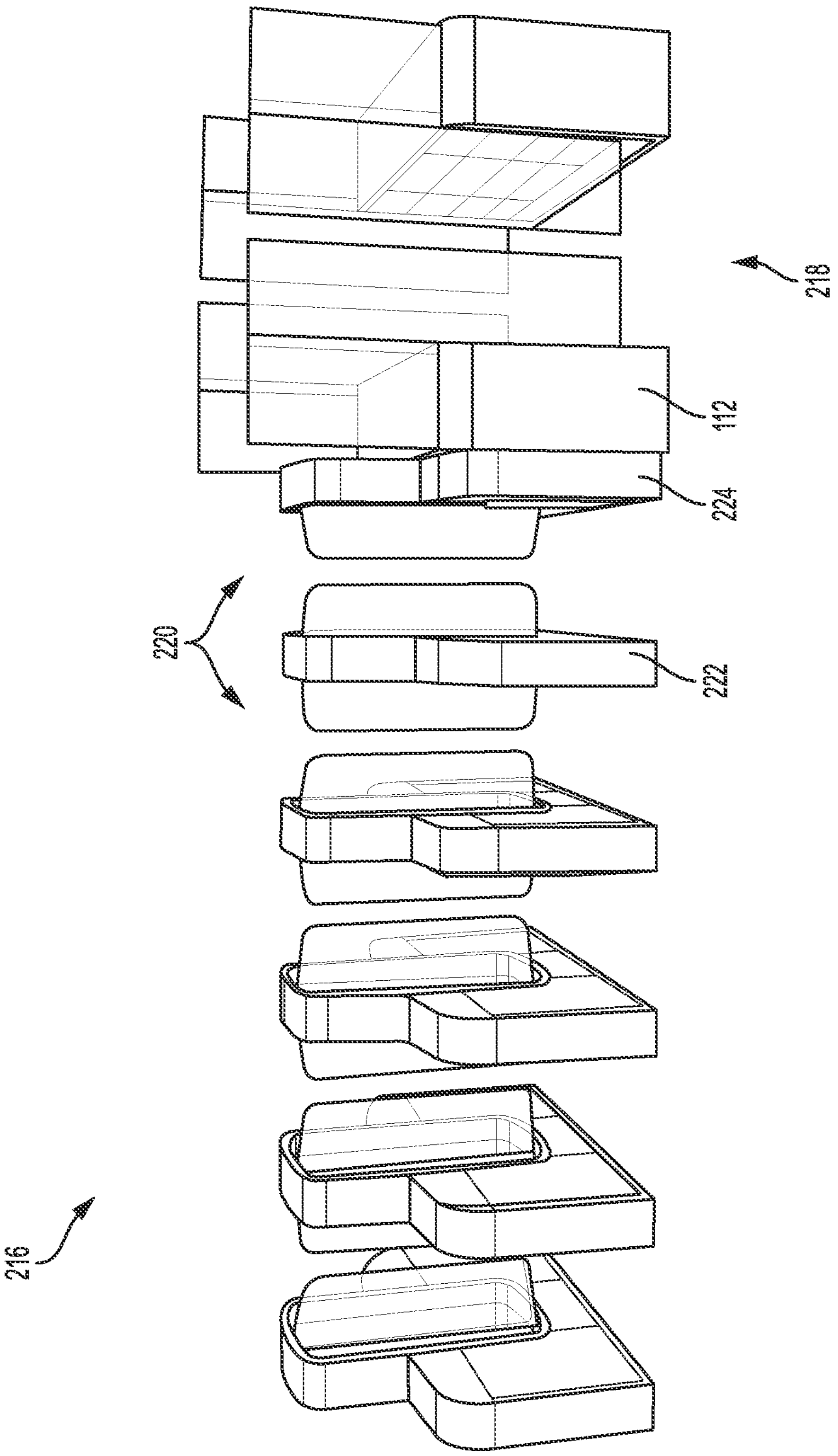
FIG. 2 is a side view of a control line including a conventional accessible access barrier.

As a non-limiting example, FIG. 2 shows an access control line 216 that includes a conventional accessible control lane 218 and a plurality of standard-width control lanes 220. The control lanes may also be referred to as access passages. The standard-width control lanes 220 each include two associated trunk portions, such as trunk portions 222 and 224, which may be shared between adjacent control lanes 220. The adjacent trunk portions 224 of the standard width control lane 220 and the left trunk portion 112 of the accessible control lane 218 cannot be combined because the left trunk portion 112 must accept the entry door 102, while the trunk 224 contains validation equipment that does not permit space in the trunk 224 for the entry door 102. The inability of adjacent trunks 112 and 224 to be combined reduces the useful width of the access control line 216 and restricts the maximum flow of the control line during periods of high traffic.

Figure 3:
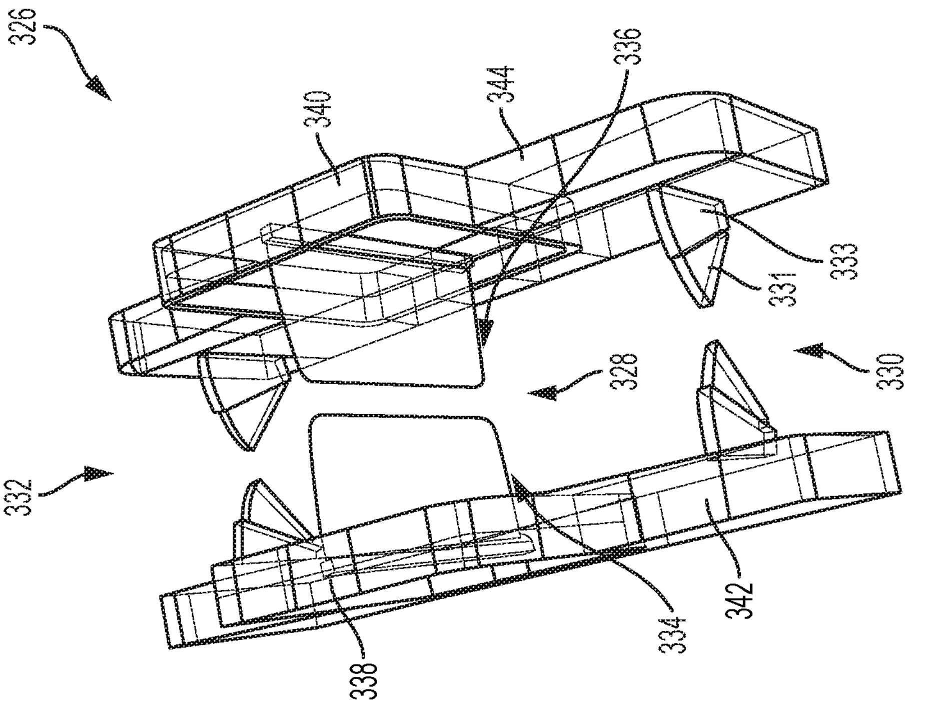
FIG. 3 is a perspective view of an access barrier according to an exemplary embodiment of the disclosure.

Referring now to FIG. 3, an access control device 326 according to an exemplary embodiment of the present disclosure is shown. The access control device 326 includes a primary access barrier 328 and one or more secondary access barriers. In the embodiment of FIG. 3, the access control device 326 includes two secondary access barriers, an entry barrier 330 located in the access control device 326 on a first side of the primary access barrier 328 and an exit barrier 332 located on a second side of the primary access barrier 328 opposite the first side. The location of the entry barrier 330 may define an entry side of the access control device 326 and the location of the exit barrier 332 may define an exit side of the access control device 326. In the embodiment of FIG. 3, the primary access barrier 328 is high enough to discourage fraudulent passage, such as by straddling and climbing over the primary access barrier 328. For example, in some exemplary embodiments, the height of the primary access barrier 328 may be at least 1 meter (3.28 feet), at least 1.5 meters (4.92 feet) at least 2 meters (6.56 feet), or greater. The height of the primary access barrier 328 may be chosen to be approximately chest-height, shoulder-height, or higher with respect to a user having an average stature. As a non-limiting example, the primary access barrier 328 comprises a pair of pivoting doors 334 and 336. The pivoting doors 334, 336 are configured to pivot into respective left and right door housings 338, 340 when the pivoting doors 334, 336 are in an open position (such as the position shown in FIG. 5D, discussed below). Thus, in contrast to a conventional accessible control barrier design, such as the access control device 100 shown in FIGS. 1 and 2, left and right trunk portions 342, 344 of the access control device 326 are not required to be equally as wide as the doors 334, 336. Rather, the width of the trunk portions 342, 344 is only required to accept the thickness of the doors and any associated components, such as devices to actuate the pivoting doors 334, 336 between open and closed positions.

The primary access barrier 328 is not limited to the example configuration shown in FIG. 3. For example, as an alternative to the pivoting doors 334, 336, in other exemplary embodiments, the primary access barrier 328 may comprise folding doors, telescoping doors, or other door configurations that provide a vertical barrier sufficiently tall to prevent unauthorized persons from climbing over or under the doors.

In the exemplary embodiment of FIG. 3, the entry and exit barriers 330 and 332 comprise fan-shaped barriers that fold into the left and right trunk portions 342, 344. Because the primary access barrier 328 is sufficiently high to prevent fraudulent passage, such as by straddling and climbing over the primary access barrier 328, the entry and exit barriers 330, 332 are not required to be as high as the primary access barrier 328. As one non-limiting example, the entry and exit barriers 330, 332 may be approximately waist-high with respect to a user having an average stature. As further non-limiting examples, the height of the entry and exit barriers 330, 332 may be in a range from 0.75 meters to 1.5 meters (2.46 feet to 4.92 feet). The entry and exit barriers 330, 332 may be the same height as one another, as shown in the exemplary embodiment of FIG. 3, or may be of differing heights. The entry and exit barriers 330, 332 can retract inside the left and right trunk portions 342, 344 without interfering with other equipment, such as ticket validation devices, associated with an adjacent control lane (such as standard-width control lanes 420 described in connection with FIG. 4).

The entry and exit barriers 330, 332 may comprise configurations different from that shown in FIG. 3. For example, rather than fan-shaped telescoping barriers, the entry and exit barriers 330, 332 may be configured as gates, swinging, rotating, or telescoping bars, pivoting doors or panels, or other configurations and combinations thereof. Further, while in the exemplary embodiment of FIG. 3, the entry and exit barriers 330, 332 each include portions extending from each of the left and right trunk portions 342, 344, in other embodiments, the entry and exit barriers 330, 332 may extend from only one of the left or right trunk portions 342, 344.

According to the exemplary embodiment of FIG. 3, the fan-shaped barriers of the entry and exit barriers 330, 332 comprise multiple telescoping portions 331, 333 that fold within one another and retract within the trunk portions 342, 344. The telescoping action of the fan-shaped barriers permits the trunk portions to retract to a narrower total width than the width of the barrier when the barrier is extended into the passage, thereby enabling the closed fan-shaped barriers to fold completely within the trunk portions 342, 344.

Figure 4:
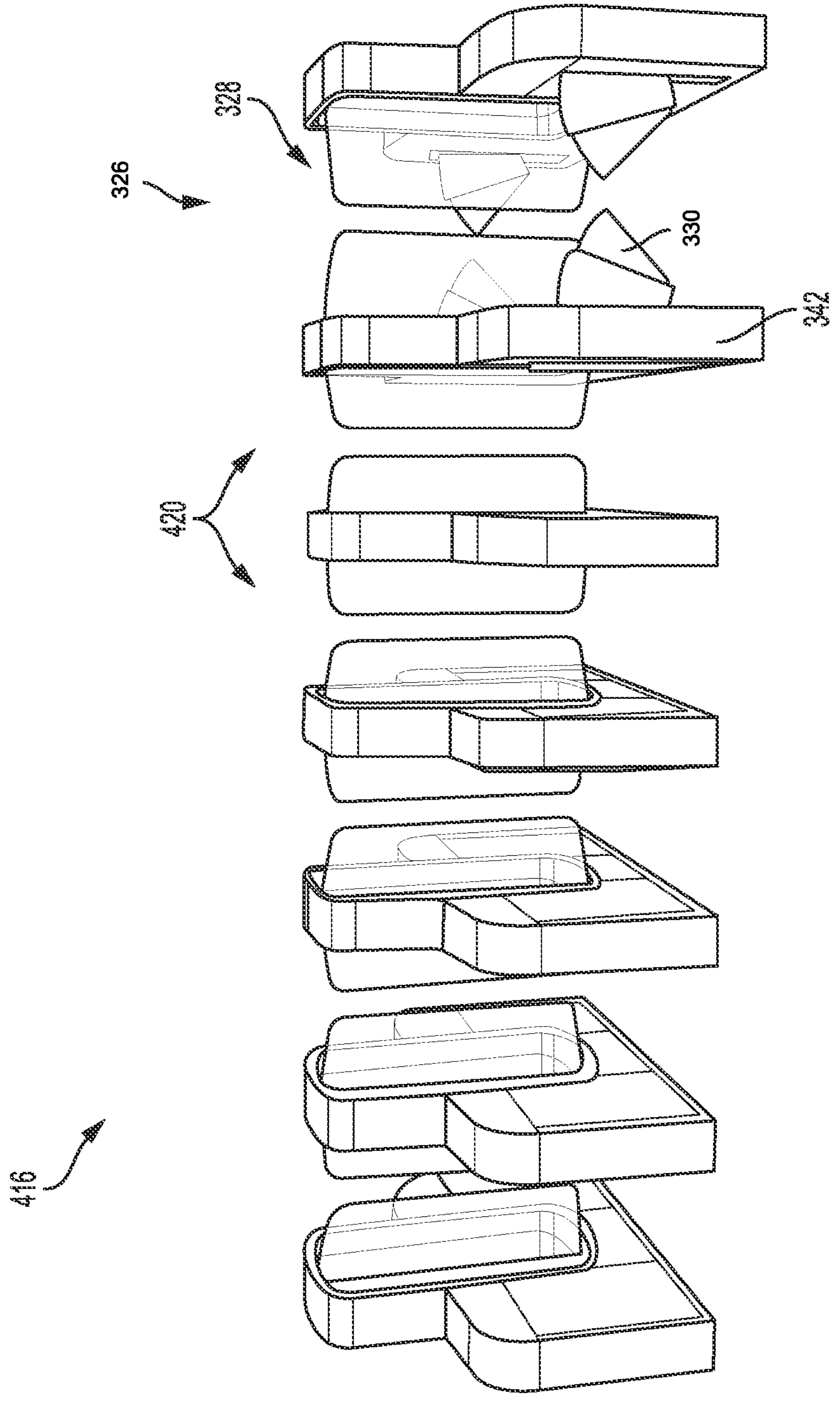
FIG. 4 is a perspective view of a control line including an access barrier according to an exemplary embodiment of the disclosure.

Referring now to FIG. 4, an access control line 416 including an access control device (which may also be referred to as an accessible control lane herein) 326 and a plurality of standard width control lanes 420 is shown. As shown in FIG. 4, a trunk portion 342 is common between the accessible control lane 326 and a standard width control lane 420. The trunk portion 342 includes a door housing 338 that accepts pivoting door 334. The trunk portion 342 also houses a left-hand portion of fan-shaped entry barrier 330 associated with the accessible control lane 326, as well as a door housing associated with the adjacent standard-width control lane 420. Because the fan-shaped barrier 330 associated with the accessible control lane 326 is only required to be approximately waist-high, the ticket validation or other access equipment can be included in the trunk portion 342, and the total width of the access control line 416 for a given number of control lanes is reduced.

The accessible control lane 326 may include various additional equipment to enable automatic operation of the entry barriers 330 (exit barriers 332 shown in FIG. 3 partially obscured by the primary access barrier 328 in FIG. 4) and primary access barrier 328. For example, the accessible control lane 326 may include various sensors to determine the location and/or progress of a person advancing through the accessible control lane, as further discussed in connection with FIGS. 5A-5H. Such sensors may include optical sensors, proximity sensors, or other sensors, operably coupled with ticket validation equipment and one or more associated electronic controllers (e.g., processors) that are operably coupled with and coordinate operation of various actuators such as motors and/or other devices that operate (e.g., open and close) the entry and exit barriers 330, 332 and the primary access barrier 328.

Figure 5A:
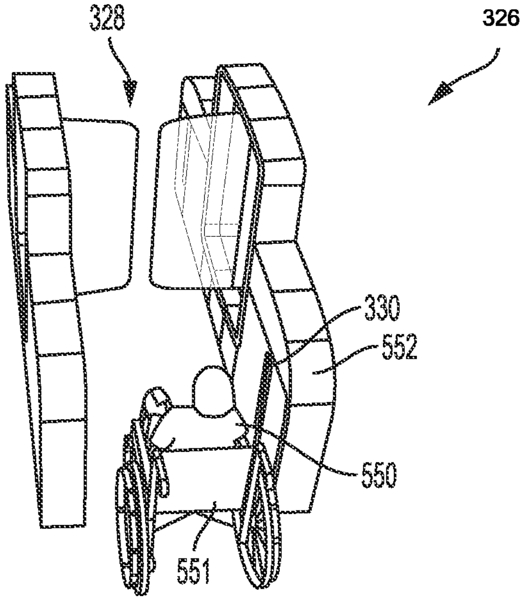
FIGS. 5A through 5H show an access sequence according to an exemplary embodiment of the disclosure.

Referring now to FIGS. 5A-5H, an exemplary entry sequence for an accessible control lane 326 is shown. In FIG. 5A, a mobility-impaired user, such as a user 550 in wheelchair 551, approaches the accessible control lane 326. In the default configuration shown in FIG. 5A, the primary access barrier 328 is in a closed position and provides an impediment against unauthorized persons traversing the passage, while the entry barriers 330 and exit barriers 332 (not visible in FIG. 5A) are in an open position.

Figure 5B:
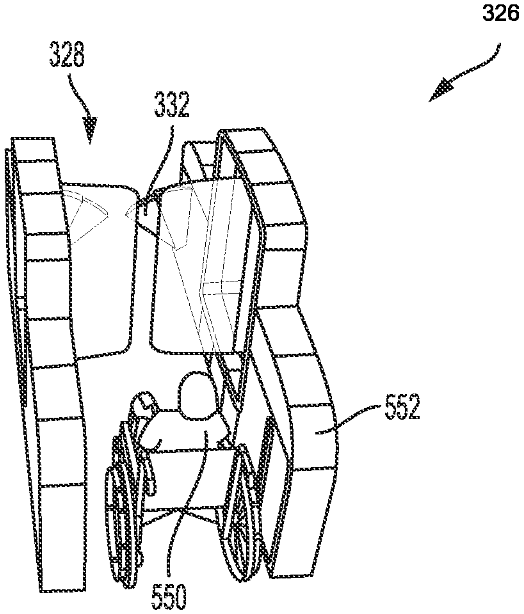
Figure 5C:
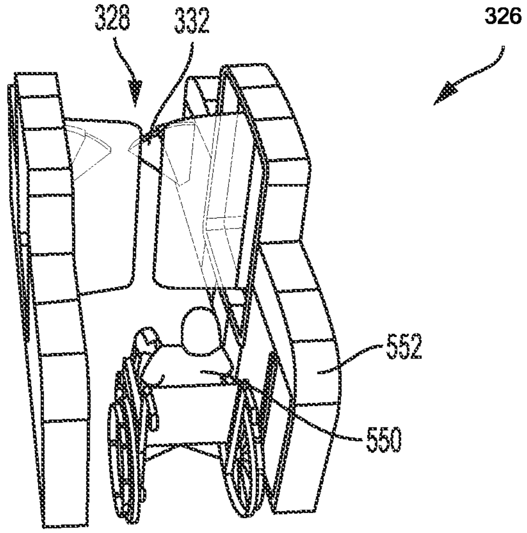
Figure 5D:
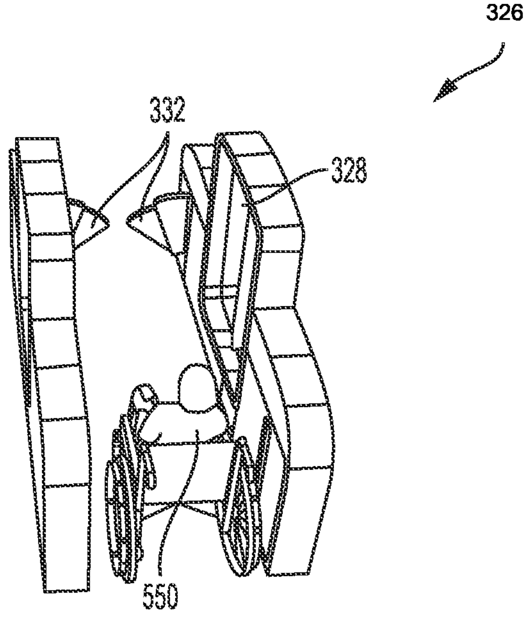

Referring now to FIG. 5B, as the user 550 enters the accessible control lane 326, as detected by the optical, proximity, or other sensors described above, the exit barriers 332 close to prevent any persons on the exit side of the accessible control lane 326 from entering the accessible control lane 326. In FIG. 5C, the user 550 validates a ticket, pass, or other validation token, at the validation device 552. Once the user 550's ticket, pass, or token is validated, the primary access barrier 328 opens, as shown in FIG. 5D, permitting the user 550 to enter the accessible control lane 326.

Figure 5E:
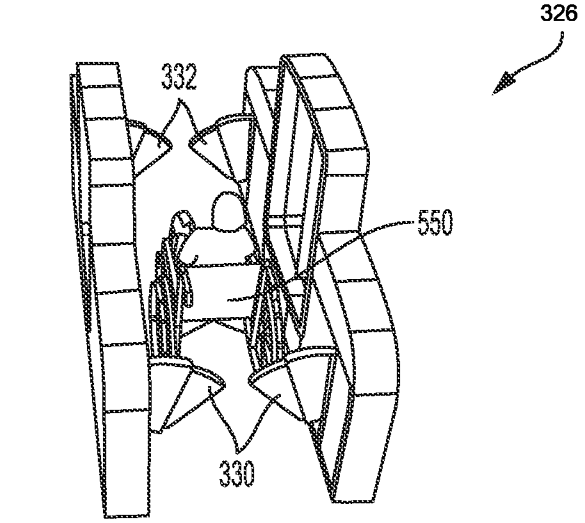

Once the user has entered the passage, based on information from sensors, such as optical sensors or proximity sensors as discussed above, the entry barriers 330 close behind the user 550, as shown in FIG. 5E. At this point, the user 550 is enclosed within the accessible control lane 326 by the entry and exit barriers 330, 332, but because the entry and exit barriers 330, 332 are waist-high, the user 550 does not feel the sense of confinement associated with the conventional access control device 100 described in connection with FIG. 1.

Figure 5F:
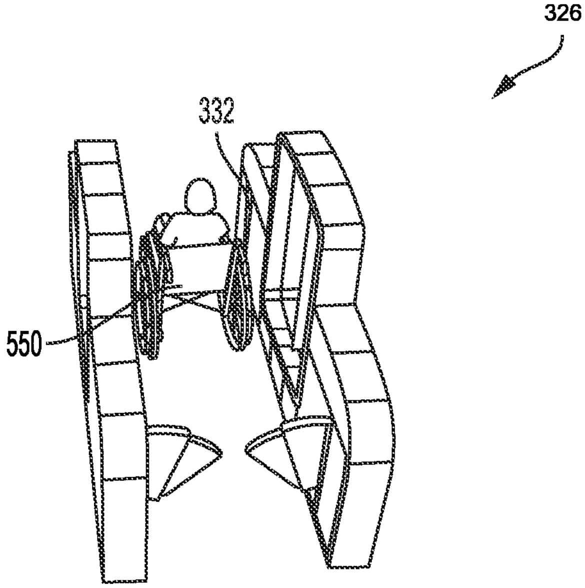
Figure 5G:
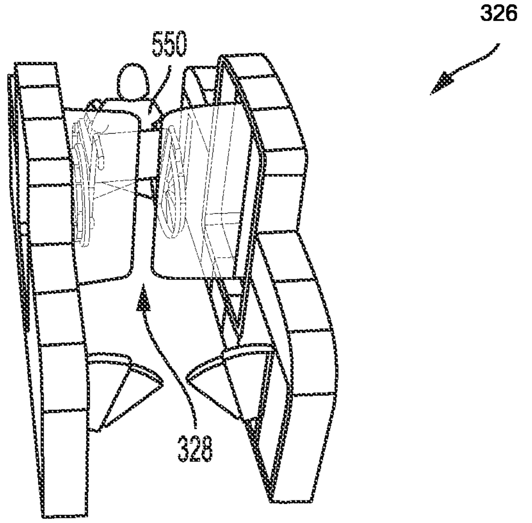
Figure 5H:
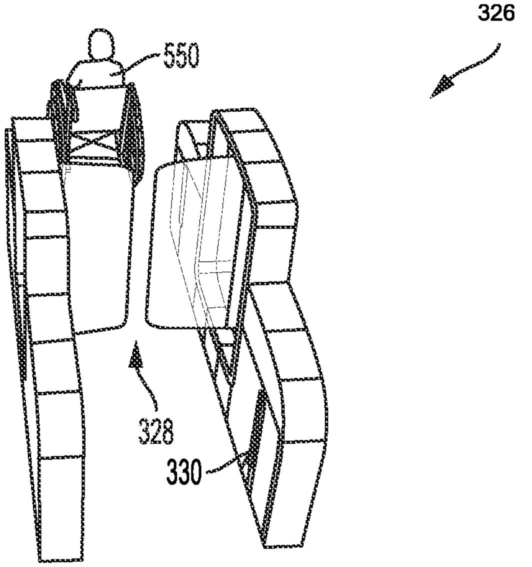

Referring now to FIG. 5F, as the user 550 advances through the accessible control lane 326, the exit barriers 332 (FIG. 5F) open to allow the user 550 to exit the accessible control lane 326. The primary access barrier 328 closes behind the user 550, as shown in FIG. 5G, as the user exits the accessible control lane 326 to prevent a fraudulent passage by an unauthorized user simultaneously with the passage of authorized user 550. Finally, once the user 550 clears the accessible control lane 326 in FIG. 5H, the entry barriers 330 reopen, leaving the primary access barrier 328 closed with the entry and exit barriers 330 and 332 open in the same configuration as shown in FIG. 5A, and the process may be repeated for any subsequent users.

Other sequences and modes of operation different from that described in connection with FIGS. 5A through 5G are within the scope of the disclosure. For example, in a first alternative mode of operation, the entry barriers 330 and exit barriers 332 are in a normally-closed configuration. When a user (such as user 550 in FIGS. 5A through 5H) approaches the accessible control lane 326 and requests entry, such as by pressing a button or other entry request device, the entry barriers 330 open, allowing the user initial access to the accessible control lane 326. Once the user has entered the accessible control lane 326, the user presents a ticket, pass, or other token at a validation device. If the ticket is valid, the primary access barrier 328 opens, allowing the user to pass into the accessible control lane 326. Once the user advances into the passage, the entry barriers 330 close. After the entry barriers 330 are fully closed, the exit barriers 332 open to permit passage of the user 550, after which the exit barriers and primary access barrier 328 closes and the accessible control lane 326 returns to its original configuration.

In a second alternative mode of operation, the sequence is like that of the first alternative mode of operation, with the exception that instead of the user 550 pressing a button or other control to gain access to the accessible control lane 326 and then presenting the ticket or other validation once the user 550 is inside the accessible control lane 326, the user 550 presents the ticket or pass upon approaching the accessible control lane 326, and the entry barriers 330 open upon validation of the ticket or pass to admit the user 550 to the accessible control lane 326.

While embodiments of the disclosure are described in connection public facilities such as rail, bus, or other transit facilities, embodiments of the disclosure can be used in any other circumstance in which access of individuals to a restricted area is to be controlled based on tickets, passes, tokens, or other forms of validation. Such other forms of validation could include numerical keypads, fingerprint scanners, retina scanners, voice pattern scanners, etc. Examples of other facilities in which access controls of the disclosure may be used include entertainment venues, sports venues, office buildings, airports, etc.

Further modifications and alternative embodiments will be apparent to those of ordinary skill in the art in view of the disclosure herein. For example, the devices, systems, and methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure and following claims.

It is to be understood that the particular examples and embodiments set forth herein are non-limiting, and modifications to structure, dimensions, materials, and methodologies may be made without departing from the scope of the present disclosure.

Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents by the following claims.

What is claimed is:

1. An access control device, comprising:

a primary access barrier configured to move between a closed position and an open position, wherein the primary access barrier is configured to extend into an access passage of the access control device to prevent access through the access passage when in the closed position and is configured to move away from the access passage to permit access through the access passage when in an open position, wherein the access passage is defined between parallel first and second trunk portions, the first trunk portion having a first width and the second trunk portion having a second width, each of the first and second widths being uniform along an entire length and height of the respective first and second trunk portions, wherein at least one of the first and second trunk portions is configured to house the primary access barrier within at least one of the respective first and second widths, when the primary access barrier is in the open position;

an entry barrier positionable in the access passage of the access control device on a first side of the primary access barrier; and an exit barrier positionable in the access passage of the access control device on a second side of the primary access barrier opposite the first side;

wherein the entry barrier and the exit barrier each have a height less than a height of the primary access barrier.

2. The access control device of claim 1, wherein the primary access barrier is configured to prevent a user from straddling the primary access barrier.

3. The access control device of claim 1, wherein the primary access barrier substantially fills a width of the access passage when in the closed position and substantially moves out of the width of the access passage in the open position.

4. The access control device of claim 1, wherein the access control device further comprises a validation device accessible to a user.

5. The access control device of claim 4, wherein one or both of the first and second trunk portions define, at least in part, a width of the access passage, and wherein the validation device is in one of the first and second trunk portions of the access control device.

6. The access control device of claim 5, wherein at least one of the entry barrier and the exit barrier is configured to retract into one of the first and second trunk portions.

7. The access control device of claim 5, wherein at least one of the first and second trunk portions comprises a second height approximately equal to one or both of the entry barrier height and the exit barrier height.

8. The access control device of claim 1, wherein the entry and exit barriers have a same height.

9. The access control device of claim 1, wherein the primary access barrier has a first configuration and at least one of the entry barrier and the exit barrier has a second configuration different from the first configuration.

10. The access control device of claim 1, wherein the primary access barrier comprises one or more pivoting doors.

11. The access control device of claim 1, wherein one or both of the entry barrier and the exit barrier comprises one or more telescoping fan-shaped barriers.

12. The access control device of claim 10, wherein the primary access barrier comprises a first pivoting door configured to pivot into a first housing within the first width of the first trunk portion and a second pivoting door configured to pivot into a second housing within the second width of the second housing.

13. The access control device of claim 12, wherein the first housing is configured to fully receive a thickness of the first pivoting door and the second housing is configured to fully receive a thickness of the second pivoting door.

14. A method of granting access to a restricted area through an access control device with an access passage defined between parallel first and second trunk portions, the first trunk portion having a first width and the second trunk portion having a second width, the method comprising:

permitting a user passage beyond an entry barrier positioned at an entry to the access control device to provide the user access to an access passage in which a closed primary access barrier is positioned, each of the first and second widths being uniform along an entire length and height of the respective first and second trunk portions, and the primary access barrier having a height greater than a height of the entry barrier;

subsequent to a user entering the access passage in which the closed primary access barrier is positioned, retracting the primary access barrier into a housing within at least one of the first and second trunk portions to allow the user to proceed beyond the primary access barrier in the access passage;

closing an exit barrier positioned at an exit of the access passage beyond the primary access barrier, the exit barrier having a height less than the primary access barrier height;

closing the entry barrier to enclose the user within the access passage; and opening the exit barrier to permit the user to exit the access passage into the restricted wherein closing the exit barrier occurs prior to the retracting the primary access barrier.

15. The method of claim 14, wherein closing the entry barrier occurs subsequent to retracting the primary access barrier.

16. The method of claim 14, wherein permitting a user passage through the entry barrier comprises maintaining the entry barrier in an open position while a user is not within the access passage.

17. The method of claim 16, further comprising maintaining the exit barrier in an open position when a user is not within the access passage.

18. The method of claim 14, further comprising activating an entry request device.

19. An access control system, comprising:

at least one first access lane, the at least one first access lane having a width defined by first and second trunk portions, wherein the first and second trunk portions extend along a length of the at least one first access lane; and at least one second access lane, the at least one second access lane being adjacent to the at least one first access lane and having a width defined by the second trunk portion and a third trunk portion, wherein the second trunk portion has a first width and the third trunk portion has a second width, each of the first and second widths being uniform along an entire length and height of the respective second and third trunk portions wherein the at least one second access lane comprises:

a primary access barrier configured to block access through the at least one second access lane in a closed position and allow passage through the at least one second access lane in an open position, the primary access barrier having a first height and being configured to move into a housing within at least one of the second and third trunk portions when in the open position; and two secondary access barriers positioned in the at least one second access lane, each on a different side of the primary access barrier, the secondary access barriers each having a second height less than the first height and being configured to at least partially retract into the second trunk portion.

20. The access control system of claim 19, wherein at least one of the two secondary access barriers comprises a fan-shaped barrier.

21. The access control system of claim 19, wherein one of the secondary access barriers comprises an entry barrier positioned on a first side of the primary access barrier and the other of the two secondary access barriers comprises an exit barrier positioned on a second side of the primary access barrier opposite the first side.

22. The access control system of claim 19, further comprising a first validation device associated with the at least one first access lane, wherein the first validation device is located in the second trunk portion.

23. The access control system of claim 22, further comprising a second validation device, wherein the second validation device is located in the third trunk portion.

24. The access control system of claim 19, wherein the first, second, and third trunk portions have substantially a same width.

25. The access control system of claim 19, wherein the at least one first access lane includes three first access lanes.

* * * * *